United States Patent [19]

Pinnavaia et al.

[11] Patent Number: 4,981,825
[45] Date of Patent: Jan. 1, 1991

[54] DRIED METAL OXIDE AND CLAY PARTICLE COMPOSITIONS AND METHOD FOR THE PREPARATION THEREOF

[75] Inventors: Thomas J. Pinnavaia, East Lansing, Mich.; Ahmad Moini, Lawrenceville, N.J.

[73] Assignee: Board of Trustees operating Michigan State University, East Lansing, Mich.

[21] Appl. No.: 406,094

[22] Filed: Sep. 12, 1989

[51] Int. Cl.$^5$ .............................................. B01J 21/16
[52] U.S. Cl. ........................................ 502/63; 502/84
[58] Field of Search ..................................... 502/63, 84

[56] References Cited

U.S. PATENT DOCUMENTS

| | | | |
|---|---|---|---|
| 2,375,641 | 5/1945 | Garrison | 502/84 |
| 2,763,622 | 9/1956 | Plank et al. | 502/63 |
| 2,862,875 | 12/1958 | Morrell | 502/84 |
| 4,248,739 | 2/1981 | Vaughan et al. | 502/63 |
| 4,271,043 | 6/1981 | Vaughan et al. | 502/84 |
| 4,499,195 | 2/1985 | Wheelock | 502/63 |
| 4,621,070 | 11/1986 | Pinnavaia et al. | 502/63 |
| 4,637,992 | 1/1987 | Lewis et al. | 502/84 |
| 4,665,044 | 5/1987 | Pinnavaia et al. | 502/84 |
| 4,665,045 | 5/1987 | Pinnavaia et al. | 502/84 |
| 4,666,877 | 5/1987 | Vaughan | 502/84 |
| 4,808,559 | 2/1989 | Sommer et al. | 502/63 |
| 4,839,318 | 6/1989 | Kawase et al. | 502/84 |

OTHER PUBLICATIONS

Yamanaka et al., Mater. Chem. Phys. 17, 87 (1987).
Occelli, Proceedings of the Int. Clay Conf., Denver, 319 (1985).
C. H. Sorum, J. Am. Chem. Soc., 50, 1263 (1928).
P. Mulvaney et al., J. Phys. Chem., 92, 6732 (1988).
Schaefer, D. W.; Keefer, K. D.; Aubert, J. H.; Rand, P. B. In Ulrich, D. R., Eds.; Wiley: N.Y., p. 140 (1986).

*Primary Examiner*—Carl F. Dees
*Attorney, Agent, or Firm*—Ian C. McLeod

[57] ABSTRACT

Dried compositions of inorganic metal oxide and clay particles wherein the oxide particles are substantially segregated from each other by the clay particles are described. The compositions have a high surface area and are useful for catalytic gaseous reactions and removal of impurities from gas.

20 Claims, 4 Drawing Sheets

FIG.3A
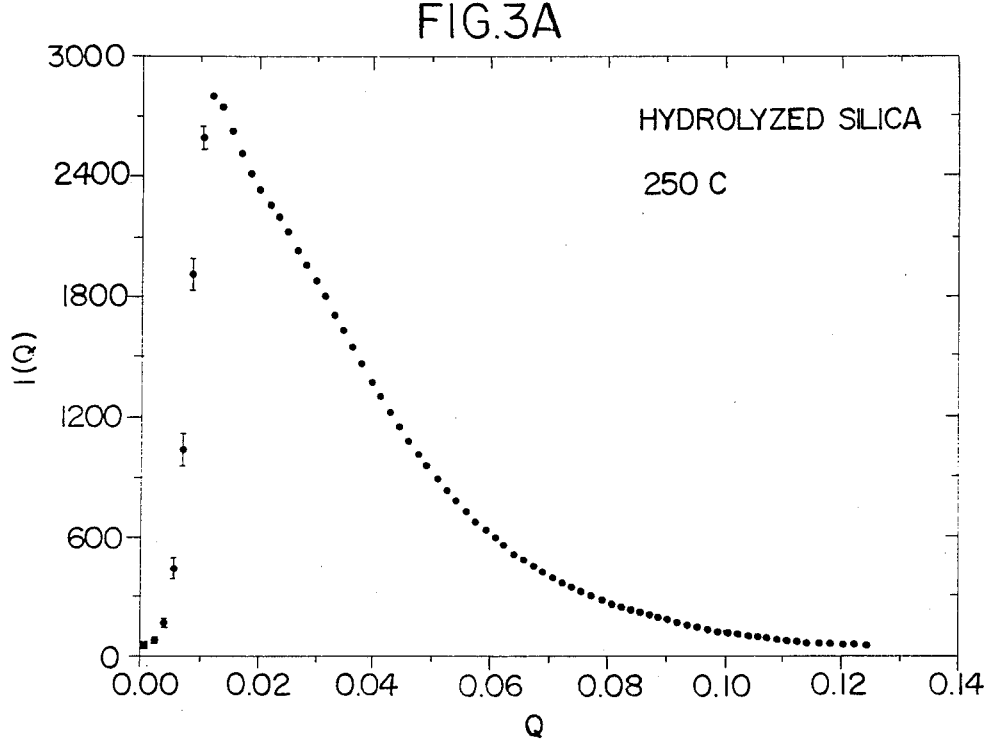
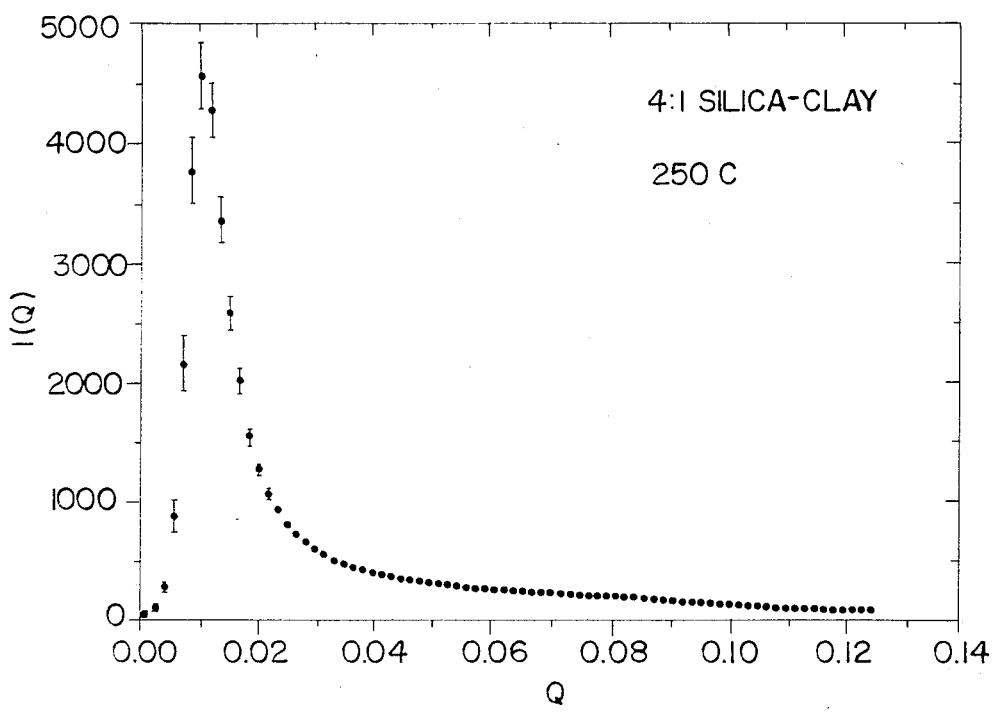
FIG.3B

DRIED METAL OXIDE AND CLAY PARTICLE COMPOSITIONS AND METHOD FOR THE PREPARATION THEREOF

FIELD OF THE INVENTION

This invention is related to sol particle-clay particle compositions in which platelets of smectite clays are arranged between metal oxide particles in an irregular fashion, thus inhibiting the aggregation and/or sintering of the metal oxide particles.

BACKGROUND OF THE INVENTION

Many metal oxides can be prepared as colloidal solutions or sols. A sol may be defined as a mixture of colloidal particles dispersed in a liquid. In such a mixture, the size of the individual particles are small enough (<1000 Å) to allow for their continuous suspension in solution.

These sols are prepared via hydrolysis of a variety of molecular species. The most well-known example is $Si(OC_2H_5)_4$ which can be hydrolyzed to form extended Si—O—Si networks. As the hydrolysis process progresses, larger particles are formed as a result of the further branching of these networks. This growth process is then stopped through dilution or addition of charged species thus stabilizing the sol particles in a certain size range. The synthesis of a variety of colloidal systems have been studied in detail, and many of these sols are commercially available.

The formation of uniform spherical particles with small particle diameters are of interest for a variety of applications, especially because of their high surface areas. For example, spherical sol particles of $SiO_2$ with a diameter of 40 Å have a theoretical surface area of 750 $m^2/g$. Once the solution is concentrated, however, these spherical particles aggregate to form larger particles. This description is similar to the concept of Ostwald ripening which states that the larger particles grow larger at the expense of the smaller particles because of the higher solubility of the latter.

Once the particles become very large, gelation of this colloidal mixture takes place. The resulting gel is a solid polymeric network which contains a fluid component. The removal of the excess liquid results in the formation of a highly aggregated 3-dimensional network of metal oxide particles. The aggregation/growth of these particles is intensified upon heating which initiates the sintering process. A significant decrease in surface area is observed as the inter-particle boundaries become less defined and the aggregated network is gradually converted into a glassy phase.

It is obvious that the aggregation and sintering of the original sol particles are not desirable in applications where porous materials with high surface areas are sought. In addition, many applications of such materials as adsorbents or catalysts require elevated temperatures which in turn promote the sintering of the particles. Therefore, there is considerable interest in designing new systems in which these particles are stabilized.

Smectite clays are natural or synthetic layered oxides such as bentonite, montmorillonite, hectorite, fluorohectorite, saponite, beidellite, nontronite, and related analogs. The layers are made up of a central octahedral sheet, usually occupied by aluminum or magnesium, sandwiched between two sheets of tetrahedral silica sites. These negatively charged layers are approximately 10 Å thick, and are separated by hydrated cations such as alkali or alkaline earth metal ions. These cations may be exchanged by other inorganic or organic cations. This feature in addition to the low charge density of the layers allow for the intercalation of a variety of species into the interlayer regions or galleries.

Prior art in the field of pillared clays has shown the formation of new phases in which oxide sols are regularly intercalated in the galleries of smectite clays. For example, see Lewis and Van Santen, U.S. Pat. No. 4,637,992; Yamanaka et al., Mater. Chem. Phys. 17, 87 (1987); Occelli, Proceedings of the Int. Clay Conf., Denver, 319 (1985). The resulting compositions no longer exhibit the X-ray diffraction properties of the parent clay. Instead, the basal spacings of the resulting pillared products are greatly enhanced due to the expansion of the clay galleries by the metal oxide particles. These pillared clay systems prepared from the sols have somewhat larger interlayer spacings compared to the traditional pillared clays (for example, see Vaughan et al., U.S. Pat. Nos. 4,248,739, 4,271,043, and 4,666,877; Pinnavaia et al., U.S. Pat. Nos. 4,665,044 and 4,665,045) formed using smaller molecular units. The pillaring phenomenon allows the basal surfaces of the host clay to be accessed by guest molecules for adsorption and possible catalysis.

Furthermore, it has been shown, see Pinnavaia and Johnson, U.S. Pat. No. 4,621,070, that a tubular aluminosilicate known as imogolite can be intercalated between the layers of montmorillonite. The imogolite tubes are approximately 23 Å in diameter and >2000 Å in length. This particular example represents one of the largest sols which has been directly intercalated in the clay galleries. This composition, as well as all of the other phases which have been reported, require high clay:sol ratios to form a regularly intercalated system.

The purpose of this invention was to inhibit the growth and sintering of finely divided metal oxide sol particles during the drying and dehydration process. This was accomplished by segregating the sol particles with smectite clay particles so that their fusion and further growth was impeded. Sol segregation can be achieved without the need for regular intercalation and pillaring of the host clay. Moreover, the clay can be substantially laminated as in the pristine natural clay such as sodium montmorillonite or it may be substantially delaminated as in the synthetic hectorite clay known as Laponite ®. In either case, the finely divided metal oxide sol particles are entrapped within the composite network over a scale length of microns or less, but greater than the scale length of 10 Å characteristic of pillared clays. It thus becomes possible to heat the composite materials to elevated temperatures without loss in the surface area of the entrapped finely divided metal oxide particles. Binding of the sol particles to the clay surfaces is believed to play an important role in stabilizing the sol particles toward growth and sintering.

DESCRIPTION OF DRAWINGS

FIG. 3A shows the neutron scattering of the product of the dried metal oxide alone and FIG. 3B shows the scattering of the product of the present invention with the clay.

SUMMARY OF THE INVENTION

Figure 1:
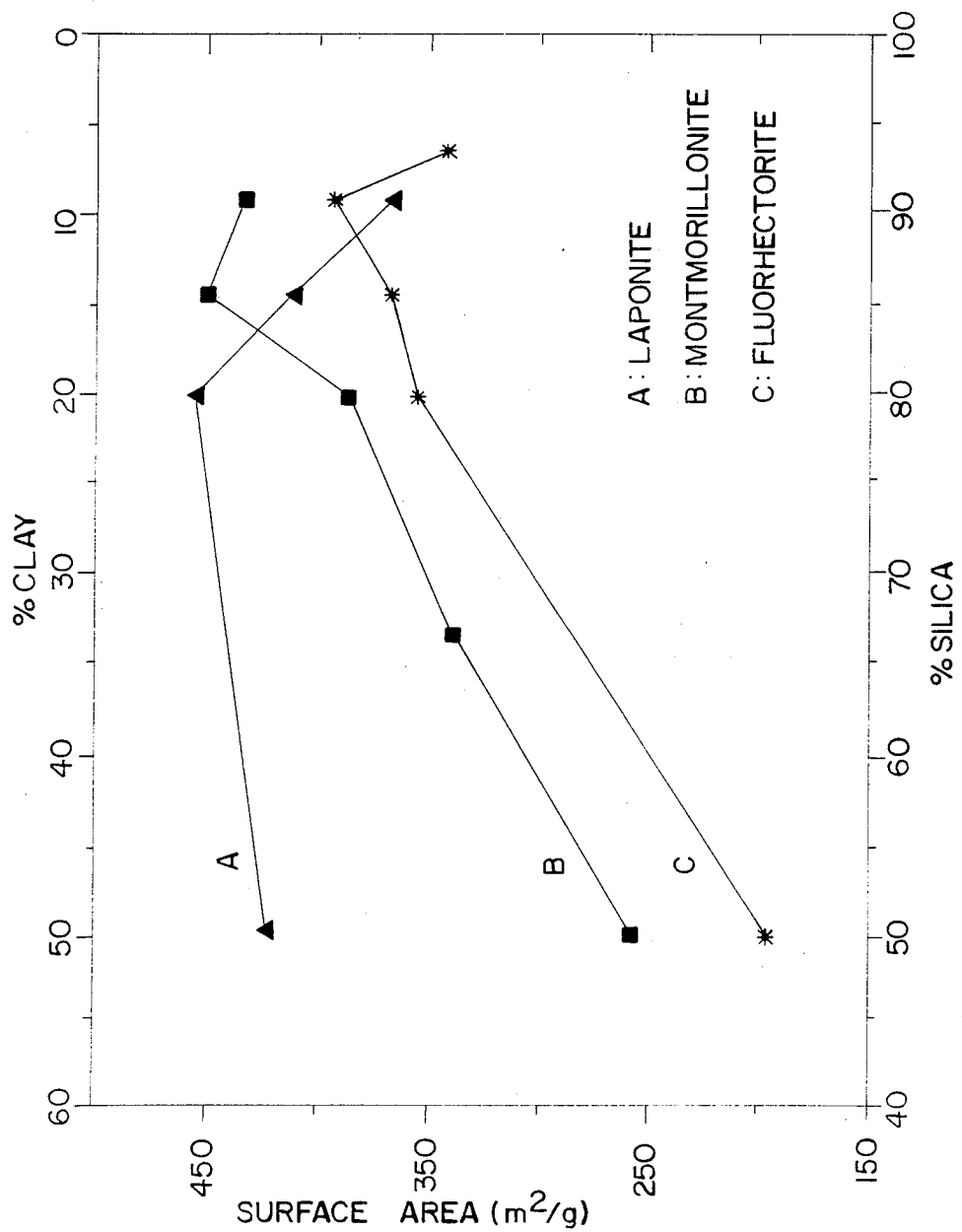
FIG. 1 is a graph showing the variation in surface area for the sol particle-clay complexes as a function of silica (or clay) content. The results shown are for products prepared from montmorillonite, fluorohectorite, and Laponite ®.

The present invention relates to a dried solid composition comprising clay particles and inorganic metal oxide particles wherein the particles are substantially segregated from each other by the clay particles which inhibit the aggregation of the metal oxide particles, wherein the composition has a surface area of at least about 50 m$^2$/g when determined by N$^2$ absorption after degassing at a temperature up to 650° C. for 1 hour in a vacuum. The pressure is preferably less than about 10$^{-2}$ mm of Hg, and usually between about 10$^{-1}$ and 10$^{-3}$ mm of Hg. Usually, the composition has a surface area greater than 160 m$^2$/g when heated at 200° C. for at least 1 hour in a vacuum. The upper limit is about 450 m$^2$/g.

Temperatures above about 650° C. begin to decompose the clay particles. At 250° C. the particles begin to degrade in the absence of clay. Thus the preferred temperature range is about 100 to 650° C. for one (1) hour in the vacuum.

The colloidal silica has an average size between about 40 and 800 Å, preferably between 40 and 80 Å. The size of the silica particles is dependent upon the size of the starting sol solution. Particle size may be determined by small angle neutron scattering studies of the original sol and of the resulting metal oxide-clay compositions.

The ratio of metal oxide to clay is between about 1:1 and 20:1, preferably between about 4:1 and 10:1. This provides effective compositions for catalytic gaseous reactions and for removal of impurities from gas streams.

The metal oxide particles and the clay particles have opposite charges. The clay particles are generally negatively charged. The charge on the metal oxide particles is dependent on the pH of the sol; pH conditions above and below the isoelectric point result in negative and positive particles, respectively. Therefore, lowering the pH of the silica sol will result in electrostatic attraction between the clay and sol particles. In some cases, the charges of these two particles could be reversed.

This invention thus involves the formation of sol particle-clay composites in which the clay platelets inhibit the aggregation of the sol particles. The resulting complexes are not ordered systems with regularly intercalated clay galleries. In fact, analyses have shown that the products are made up of irregular sol-clay networks in which the clay platelets are placed between the sol particles. Such an arrangement does not allow for efficient contact between the sol particles, and prevents them from significant aggregation. The result is a composite with very high surface areas and the ability to retain such high surface areas at elevated temperatures.

It should be noted that this invention is clearly different from the previous inventions, particularly Lewis and Van Santen, U.S. Pat. No. 4,637,992, in which sol particles were regularly intercalated into the clay galleries. In the latter systems, X-ray diffraction studies provided clear evidence for the expansion of the interlayer gallery space to form alternating layers of clay and sol. Such an intercalated system would require large clay:sol ratios. In contrast, the present invention requires extremely low amounts of clay (<10%) to modify the aggregation/gelation of the sol by forming an irregular sol particle-clay complex. Such an arrangement stabilizes the oxide particles to such a degree that the sintering process is also inhibited at elevated temperatures.

The clays used in these reactions included a natural Wyoming Na$^+$-montmorillonite (<2u, Na$_{.70}$[Al$_{3.1}$-$_1$Fe$_{.42}$Mg$_{.48}$] (Si$_{7.88}$Al$_{0.12}$)O$_{20}$(OH)$_4$, 80 meq/1100 g), a fluorohectorite (>>2u, Li$_{1.6}$[Mg$_{4.4}$Li$_{1.6}$](Si$_{8.0}$) O$_{20}$-(OH)$_4$, 120 meq/100 g), and a synthetic hectorite known as Laponite ® (200–500 Å, Li$_{0.36}$[Mg$_{5.64}$Li$_{0.36}$]Si$_{8.00}$O$_{20}$(OH)$_4$), 48 meq/100 g). Some of the oxide sols were obtained from Nalco Chemical Company, Oak Brook, Ill. These solutions are described by the manufacturer as containing spherical sol particles which are uniform in size.

The product is prepared by diluting an oxide sol to <1 wt. % followed by reducing the pH below its isoelectric point (~3.0 for SiO$_2$ sols.) This is accomplished by adding a dilute acid such as 0.5N HCl. The resulting solution is aged for several minutes, and is then allowed to react with a 1 wt. % suspension of clay. The mixture is stirred for 12–72 hrs., followed by drying in air to form a sol-clay composite material.

The sol:clay ratios were varied from approximately 1:1 to 20:1. A reference reaction was also carried out in which the sol was treated in the absence of clay for a comparable period of time. The properties of the hydrolyzed sol were compared to those of the sol-clay composites.

Most of the reactions were performed using Nalco silica #1115 with a manufacturer's specified particle size of 40 Å. The X-ray patterns for all of the sol-clay complexes prepared using Nalco 1115 and Na$^+$-montmorillonite indicated the presence of some unreacted clay. The intensity of these peaks, however, decreased significantly with increasing silica content. The surface area determinations showed similar values for the hydrolyzed silica and the 1:1 silica-clay composite. As the silica content was increased, however, a very significant increase in surface area was observed. The highest surface areas were found for silica-montmorillonite complexes containing less than 15% clay.

The same type of behavior was observed for complexes prepared using other types of clay. The optimum sol:clay ratio needed to obtain the highest surface area was highly dependent on the clay type. As shown in FIG. 1, the maximum surface area for the Laponite ®, montmorillonite, and fluorohectorite systems occur at 80 wt. % silica (20 wt. % clay), 85.7 wt. % silica (14.3 wt. % clay), and 93.8 wt. % silica (6.2 wt. % clay), respectively. Thus, the amount of clay needed to achieve maximum surface area is correlated with the lateral platelet size of the clay in the order: fluorohectorite<montmorillonite<Laponite ®. Consequently, swelling clays with intermediate values of charge density (80–100 meq/100 g) and large lateral platelet size are preferred for optimizing the surface area of a sol particle-clay complex.

A very significant aspect of this invention is the stability of the products at higher temperatures. Surface area measurements on a sample of hydrolyzed silica sol clearly shows the drop in surface area as a function of degassing temperature. Comparison of these results (FIG. 2) with those obtained on a silica sol-montmorillonite composite demonstrated the degree of stability which is achieved when less than 15% clay is incorporated into the sol.

The following alternatives or equivalents can be applied to the present invention:

(a) Metal oxide sol particles larger or smaller than the average particle sizes may be used for the formation of sol-clay composites. The sol may be synthesized directly from alkoxides (for example, tetraethylorthosilicate) or it may be a stabilized sol produced by commercial processes.

(b) Any oxide sol may be substituted for the sols utilized in the demonstration of this invention. These sols can be divided into three categories. The first group includes refractory-type oxides, e.g. $SiO_2$ and $Al_2O_3$, which could serve as catalyst supports in a dispersed state. The second group includes transition metal oxides, e.g. $Cr_2O_3$, $Fe_2O_3$, and $MoO_3$, which themselves behave as catalysts. The third group includes reactive oxides and related systems such as $CaO$ and $Ca(OH)_2$ which have basic properties, and $P_2O_5$ and $P_4O_6$ which have acidic properties. Sols from all of these categories can be generated by hydrolysis of simple salts and/or alkoxides.

(c) Any members of the 2:1 layered silicate clays, particularly those capable of undergoing swelling such as sodium exchange forms of the smectite class of clay minerals, may be used as the clay component. In general, alkali metal exchange forms (e.g. $Li^+$, $Na^+$) are preferred because of their ability to impart swelling and good dispersion of the clay component. Specific examples of smectite clays include montmorillonite, hectorite, saponite, beidellite, nontronite, and their synthetic analogs such as fluorohectorite and Laponite®. Also, dispersible 2:1 layered silicates such as vermiculite, tetrasilicic mica and taeniolite are useful.

DETAILED DESCRIPTION

In order to illustrate the details of this invention, several specific Examples are provided below. The present invention, however, is not limited to these Examples.

EXAMPLE I

A diluted solution of Nalco 1115 (40 Å $SiO_2$ sol, Nalco Chemical Company, Oak Brook, Ill.) was prepared by diluting 2.5 g of the sol in approximately 25 mL $H_2O$. The concentration of the resulting solution was approximately 1 wt. % $SiO_2$. The pH of this solution was then decreased from ~10 to ~3 by adding 1.2 mL 0.5N HCl. This reduction in pH was carried out to ensure a positive charge on the surface of the sol particles. The acidified solution was stirred for 20 minutes. This step was followed by the addition of 10 g of a 1 wt. % suspension of $Na^+$-montmorillonite ($Na_{.70}[Al_{3.11}Fe_{.42}Mg_{.48}](Si_{7.88}Al_{0.12})O_{20}(OH)_4$). The sol:clay ratio for this preparation was 4:1. This mixture was covered and stirred for 24 hours. The resulting solution was poured on a glass plate, and was air-dried. A portion of this product was outgassed at 200° C. for 12 hours at $10^{-2}$ mm of Hg, and its surface area was determined by $N_2$ BET adsorption. This is done by determining the area covered by the adsorbed gas according to BET theory. The value obtained for this 4:1 silica sol-montmorillonite complex was 386 m²/g. Also related to this Example are other silica sol-montmorillonite complexes prepared with ratios ranging from 1:1 to 20:1. The surface areas for these phases are shown in FIG. 1 (curve B). In comparison to these values, the hydrolyzed silica sol containing no clay had a surface area of 259 m²/g.

EXAMPLE II

In this Example, the acidified silica sol was reacted with a sample of fluorohectorite ($Li_{1.6}[Mg_{4.4}Li_{1.6}](Si_{8.0})O_{20}(OH)_4$). A sample of Nalco silica 1115 was diluted to ~1 wt. %, and the pH was adjusted to ~3. After 20 minutes, a 1 wt. % suspension of fluorohectorite was added. The compositions of the silica sol-fluorohectorite phases varied between 1:1 and 20:1. The compositions were dried as in Example I. The surface areas for these compositions are represented by curve C of FIG. 1.

EXAMPLE III

In this Example, the acidified silica sol was reacted with a sample of Laponite® $Li_{0.36}[Mg_{5.64}Li_{0.36}]Si_{8.00}O_{20}(OH)_4$). A sample of Nalco silica 1115 was diluted to ~1 wt. %, and the pH was adjusted to ~3. After 20 minutes, a 1 wt. % suspension of Laponite® was added. The compositions of the silica sol-Laponite® phases varied between 1:1 and 20:1. The compositions were dried as in Example I. The surface areas for these compositions are represented by curve A of FIG. 1.

EXAMPLE IV

Figure 2:
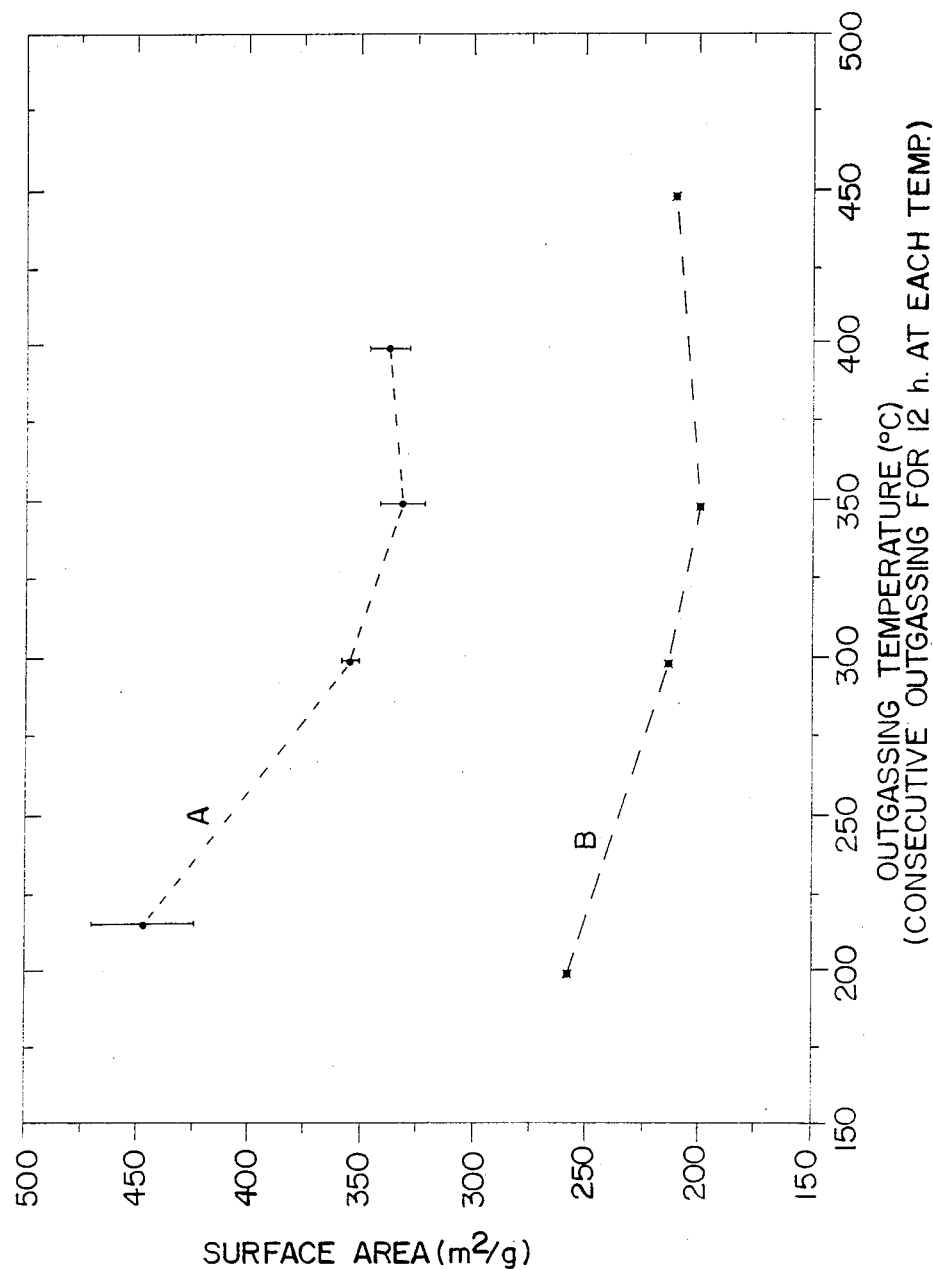
FIG. 2 is a graph showing the variation in surface area as a function of outgassing temperature for (A) a 6:1 silica sol-montmorillonite complex and (B) a hydrolyzed silica sol. Both of the products were prepared using Nalco ® silica sol #1115 with 40 Å particle diameter.

In this Example, a 6:1 silica sol-montmorillonite complex prepared by the procedure of Example I was treated at different temperatures. The $N_2$ BET surface area of this product was determined after outgassing for 12 hours at each temperature. The results are shown in FIG. 2 (curve A). These surface area values were compared to those obtained for a hydrolyzed silica sol product containing no clay. The data for this product are also shown in FIG. 2 (curve B).

EXAMPLE V

In this Example, the source of silica sol was a hydrolyzed form of tetraethylorthosilicate (TEOS). The reaction was initiated by mixing 9.2 mL $Si(OC_2H_5)_4$ (yielding ~2.48 g $SiO_2$) with 15 mL of ethanol. A few drops of $H_2O$ were added, and the stirring was continued for an additional 2-5 minutes. In the meantime, 20 g of a 1.24% suspension of $Na^+$-montmorillonite (0.248 g montmorillonite) was diluted to ~100 mL with $H_2O$. 1.0 mL 0.5N HCl was added to slightly decrease the pH. The hydrolyzed silica solution was added to this clay suspension during a period of ~30 minutes. The $SiO_2$:clay ratio was 10:1. The final mixture was stirred for 62 hours, and was dried in air. The $N_2$ BET surface area for this product outgassed at 200° C. at $10^{-2}$ mm of Hg was determined to be 460 m²/g. This value can be compared to the surface area obtained from the hydrolyzed silica containing no clay which was 176 m²/g.

EXAMPLE VI

This example describes the use of a transition metal oxide sol for the preparation of a sol-clay complex. A previously known synthetic procedure (C. H. Sorum, J. Am. Chem. Soc., 50, 1263 (1928)) was followed to prepare a $Fe_2O_3$ sol. The preparation involved the addition of 50 mL of freshly prepared 0.02M $FeCl_3$ solution to 450 mL of boiling $H_2O$. The rate of addition was approximately 2 drops/s. The final solution was boiled for an additional 5 minutes, followed by cooling it to room temperature. The sol was then dialyzed for 48 hours against perchloric acid to obtain a chloride-free $Fe_2O_3$ sol with reported particle diameter of 50±10 Å (P. Mulvaney et al., J. Phys. Chem., 92, 6732 (1988).) The pH of this sol was ~3.5 which is well below the isoelectric point of $Fe_2O_3$ (between 7 and 8.) The synthesis of the $Fe_2O_3$ sol-montmorillonite complex involved the addition of 3.23 g of a 0.77% $Na^+$-*montmorillonite suspension to* 200 mL of the $Fe_2O_3$ sol. The sol:clay ratio was 10:1. The mixture was stirred for 1 hour. The final product was washed with $H_2O$ and air-dried. The $N_2$ BET surface area for this product outgassed at 200° C. at $10^{-2}$ mm of Hg was 130 $m^2/g$.

EXAMPLE VII

Figure 4A:
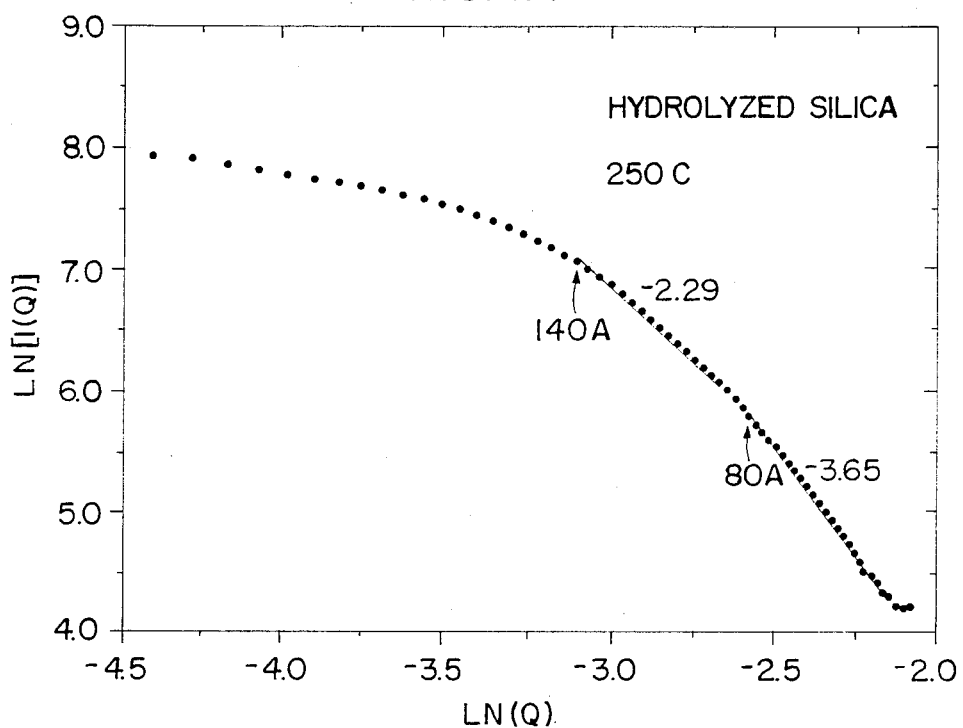
FIGS. 4A and 4B show log-log plots of the data shown in FIGS. 3A and 3B.

Small-angle neutron scattering (SANS) was used to characterize the silica sol-clay products. The SANS data for the hydrolyzed Nalco 1115 after heating at 250° C. is shown in FIG. 3A. The key feature is the scattering at low Q which corresponds to large size domains. The log-log plot of the same data is shown in FIG. 4A. These results are indicative of the formation of a globular particle network. SAXS studies (Schaefer, D. W.; Keefer, K. D.; Aubert, J. H.; Rand, P. B. In "Science of Ceramic Chemical Processing," Hench, L. L.; Ulrich, D. R., Eds.; Wiley: New York, 1986, p. 140) on silica gels have shown similar patterns in which the low-Q region is flat, but at higher Q's, two power-law slopes of approximately $-2$ and $-4$ are obtained. The overall structure has been explained as being uniform for large dimensions (flat region), followed by chain-like in the intermediate size range (slope ~ $-2$), and smooth surfaces for the small dimensions (slope ~ $-4$). In other words, the system is a highly aggregated network of smaller spherical particles.

Figure 4B:
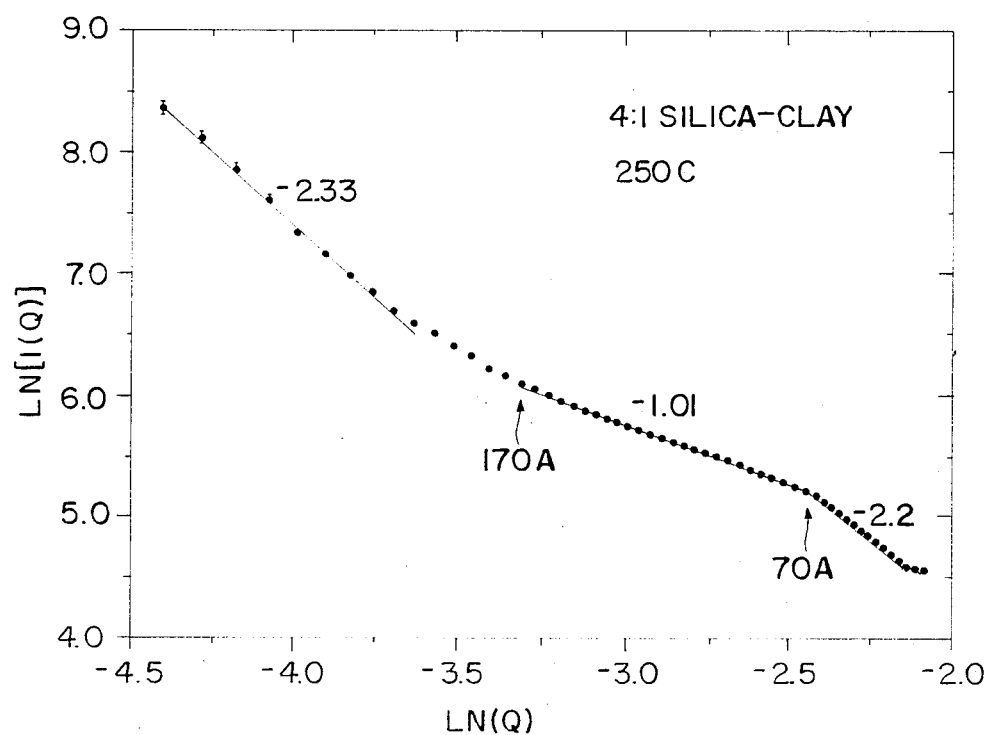

The globular network observed for the heated silica product is not observed for the heated 4:1 silica-clay sample (FIGS. 3B and 4B). In fact, the log—log plot of the data for this sample is very similar to that observed for the air-dried species. This comparison clearly shows the decrease in the degree of aggregation of the silica particles in the presence of clay platelets.

We claim:

1. A dried solid composition comprising clay particles and inorganic metal oxide particles wherein the particles are substantially segregated from each other by the clay particles which inhibit the aggregation of the metal oxide particles, wherein the composition has a surface area of at least about 50 $m^2/g$ when determined by BET $N_2$ adsorption after degassing at a temperature up to 650° C. for 1 hour in a vacuum.

2. The composition of claim 1 with a weight ratio of clay particles to metal oxide particles which provides surface areas of the dried composition greater than 160 $m^2/g$ when heated at 200° C. for 1 hour in a vacuum.

3. The composition of claim 1 wherein the metal oxide:clay weight ratio is between about 1:1 and 20:1.

4. The composition of claim 1, wherein the composition has been heated at elevated temperatures above 200° C.

5. The composition of claim 4 wherein the metal oxide:clay weight ratio is between 1:1 and 20:1.

6. The composition of claim 1 wherein the metal oxide is a colloidal silica having particles with an average size of between about 40 and 800 Å.

7. The composition in accordance with claim 6, wherein the colloidal silica has an average particle size in the range of about 40 to 80 Å.

8. The composition of claim 1 wherein the metal oxide has been prepared via hydrolysis of tetraethylorthosilicate.

9. The composition of claim 1 wherein the metal oxide is a transition metal oxide.

10. The composition of claim 1 wherein the clay is a 2:1 layered silicate clay.

11. The composition in accordance with claim 1 wherein the clay is selected from the group consisting of smectites, fluorohectorite, synthetic hectorite, vermiculite and tetrasilicic mica.

12. A method of preparing a metal oxide particle and clay particle composition wherein the metal oxide particles are substantially segregated from each other by the clay particles which inhibit the aggregation of the metal oxide particles comprising the steps of:
    (a) providing metal oxide particles in a liquid;
    (b) adjusting the pH below the isoelectric point with the metal oxide particles in the liquid so that the particles have one charge; and
    (c) mixing a suspension of the clay in the liquid to the sol particles in the liquid until the sol particle and clay particles are dispersed, wherein the clay has an opposite charge from the sol particles; and
    (d) drying the composition to remove the liquid.

13. A method in accordance with claim 12, wherein the drying is at temperatures between about 100° and 650° C.

14. The method of claim 12 wherein the liquid is water.

15. The method of claim 12 wherein the metal oxide particles are a colloidal silica having particles with an average particle size of between about 40 and 800 Å.

16. The method of claim 12 wherein the metal oxide particles have been prepared via hydrolysis of tetraethylorthosilicate.

17. The method of claim 12 wherein the metal oxide is a transition metal oxide.

18. The method of claim 12 wherein the clay is a 2:1 layered silicate clay.

19. The method of claim 12 wherein the clay is selected from the group consisting of smectites, fluorohectorite, synthetic hectorite, vermiculite and tetrasilicic mica.

20. The method of claim 19 wherein the liquid is water.

* * * * *